P. EDTBAUER.
WEIGHING MACHINE.
APPLICATION FILED NOV. 29, 1915.

1,224,289.

Patented May 1, 1917.
2 SHEETS—SHEET 1.

Witnesses:
W. T. Smith
Florence Mitchell

Inventor:
Petronella Edtbauer
By Frank D. Thomason
Atty.

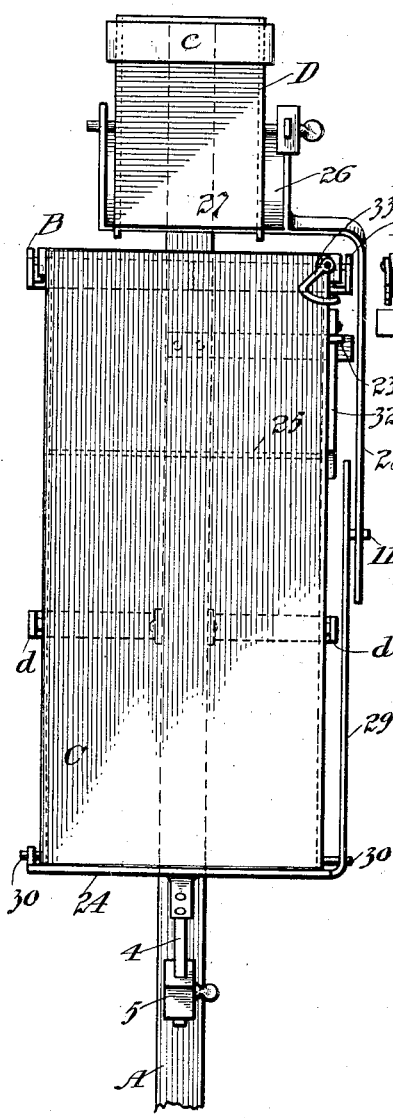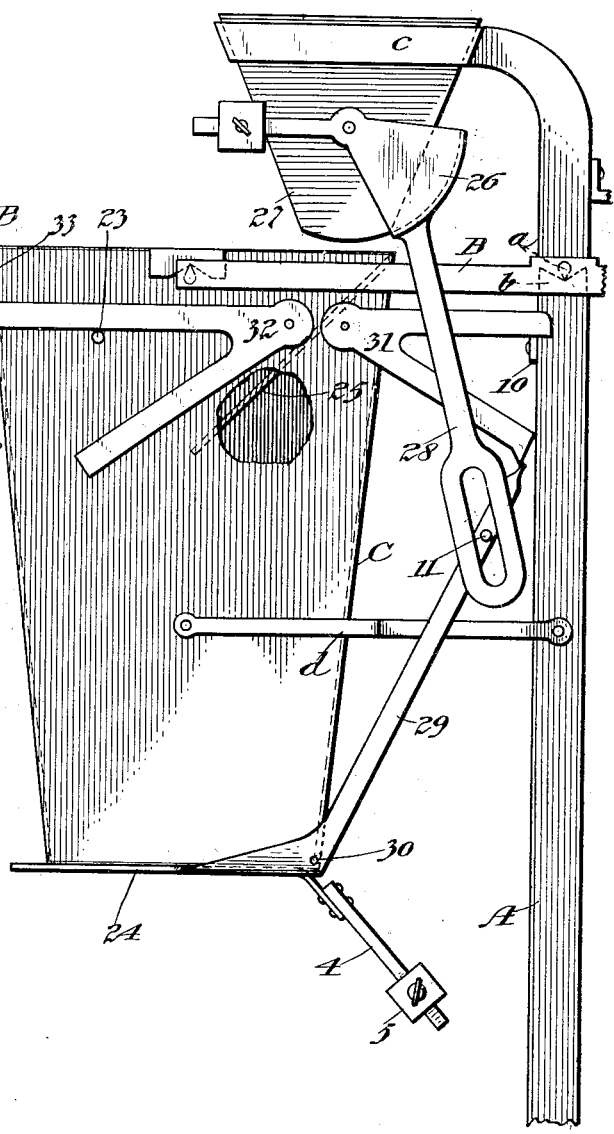

UNITED STATES PATENT OFFICE.

PETRONELLA EDTBAUER, OF CHICAGO, ILLINOIS.

WEIGHING-MACHINE.

1,224,289.   Specification of Letters Patent.   Patented May 1, 1917.

Application filed November 29, 1915. Serial No. 64,009.

*To all whom it may concern:*

Be it known that I, PETRONELLA EDTBAUER, a citizen of the United States, residing at Chicago, in the county of Cook and State of Illinois, have invented new and useful Improvements in Weighing-Machines, of which the following is a full, clear, and exact description.

My invention relates to improvements in automatic weighing machines, and particularly to the type of weighing machines for which Letters Patent of the United States were granted to me December 14, 1909, numbered 943,012.

The object of my invention is to provide a weighing machine, the operation of which, to weigh any given predetermined measure of the desired product, can be controlled by hand, or can be made to continuously weigh said measure in and intermittently discharge the same from its single bin, and it is a further object to simplify the construction of the machine and reduce the cost of its manufacture. This I accomplish by the means hereinafter fully described, and as particularly pointed out in the claims.

In the drawings:

Fig. 3 is a side view of a modified construction of my invention.

Fig. 4 is a front view of the same.

Figure 1:
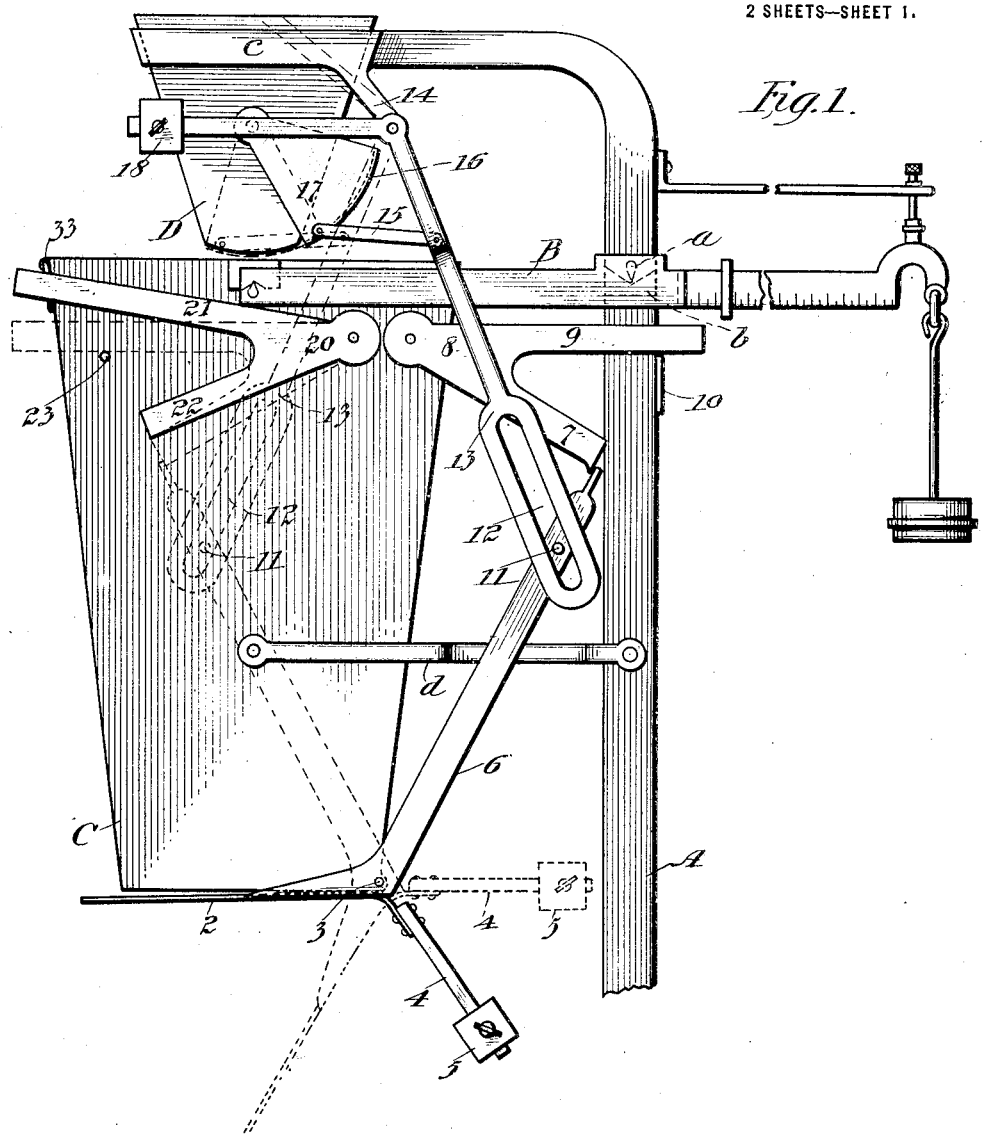
Figure 1 is a side elevation of my improved machine.
Figure 2:
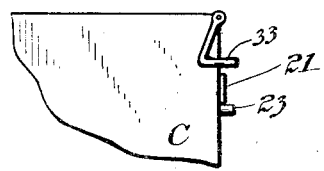
Fig. 2 is a detail view of a fragment thereof.

In its essentials my improved machine is the same as that illustrated and described in the aforesaid Patent, No. 943,012, that is, it has a supporting-frame A arising from a suitable base (not shown); it has a balance-beam scale B that has knife-edge trunnions $a$ fulcrumed in suitable bearings $b$ projecting from said standard, and it has a bin C suitably supported between the bifurcated ends of said balance-beam and adapted to receive the discharge from a superposed hopper D, as will hereinafter be more fully explained. There is nothing new in the construction of the balance-beam. The new features of my invention are confined to the mechanism for automatically cutting off the supply of the product from the hopper when the proper measure has been weighed in the bin, and closing the bin and opening the hopper after the desired measure of the product has been discharged from the bin.

The upper end of the standard is provided with an overhanging horizontal beam $c$, the portion of which farthest from the standard is looped and adapted to support hopper D in a stationary position over bin C. The upper portion of the latter, as stated, is supported between the bifurcations of the balance-beam, and the lower portion is held out from standard A by a link $d$ the ends of which are pivotally secured to said standard and said bin. The bin itself is, preferably, rectangular in horizontal section and is of any desired shape, although I prefer to make it slightly tapering in form from its top to its open bottom. This bottom is closed by a flat plate 2 of greater rectangular dimensions than the edges of the open bottom of the bin and is mounted and pivotally secured to the trunnions 3, 3, projecting laterally from the lower right hand corner of the sides of the bin. An arm 4 is secured to the center of the underside of plate 2 near its rear edge and projects downward therefrom at a suitable angle, substantially as shown, and has a weight 5 adjustable longitudinally thereon, and said bottom plate also has an arm 6 projecting upward and rearward from its side edge next the rear edge thereof at an obtuse angle.

Arm 6 projects upward a suitable distance and its upper end is twisted to present a flat surface to the downwardly and rearwardly projecting branch 7 of an acute angular trip 8, which latter is pivoted at its angle to the side of the bin near the upper edge thereof adjacent its rear side, and has its horizontally disposed longer arm 9 project rearwardly beyond the bin a suitable distance. Adjacent the rear end of branch 9 of this trip it rests upon a stationary stop 10 that consists of a metal strip that is secured to and projects from the standard of the supporting-frame, and when the bin receives the measure of the product it is engaged in weighing, the bin will move downward and stop 10 will move arm 9 upward slightly and branch 7 of the trip will move out of engagement with arm 6, and the load on plate 2 of the bin will cause said plate to move downward so that it can discharge and throw arm 6 forward into substantially the position shown by dotted lines in Fig. 1 of the drawings.

The end of arm 6, below where it is engaged by the trip, is provided with a stud 11 and this stud projects laterally out through a longitudinally elongated slot 12 in the lower end of a pendulous arm 13 whose upper end is pivotally connected to the lower end of a bracket 14 secured to and depending from overhanging beam $c$ of standard A, and when arm 6 is moved forward by the dropping of the bottom of the bin, stud 11 swings arm 13 forward into position shown in dotted lines in Fig. 1. Arm 13 is connected by means of a horizontally disposed link 15 with one of the sides of a swinging-bottom that regulates the discharge from the hopper, and this bottom consists of a segmental plate 16, the side edges of which have upwardly projecting corresponding fan-shaped wings 17 the upper ends of which are pivotally connected to the side of hopper D at a point intersected by the vertical transverse plane of the center of length of the opening in the hopper. The axis of the movement of this swinging bottom is so located that when said bottom is swung, through the medium of the forward movement of the link, it will close the discharge-opening of the hopper, and when it is swung to the rear limit of its movement it will open said opening. Arm 13 is counterbalanced by means of a weight 18 which is adjustably mounted upon an arm extending forward from the boss of arm 13 that will be in a substantially horizontal position when said arm is at the limit of its rearward movement, substantially as shown in the drawings.

When it is desired to operate the machine continuously, all that it is necessary to do is to adjust the weight on the balance-beam properly and then to start the product flowing from the hopper into the bin. When the desired measure has been accumulated therein the weight of the bin and its load will cause it to move downward, and the moment it does this, branch 7 of trip 8 will release arm 6 and plate 2 will dump its load and at the same time arm 6 will move forward and swing pendulous arm 13, which latter, through the medium of link 15 will cause bottom 16 to close the hopper. The discharging of the bin and the closing of the hopper will only be of temporary duration, as the counterweights 5 and 18 will move arms 6 and 13 back to their first positions immediately thereafter, and the product will again quickly accumulate in the bin and be discharged therefrom as soon as the desired measure is obtained, and this operation of alternately opening the bottom of the hopper and closing the bin and vice versa will be repeated as long as there is product enough to keep the machine in operation, or until it is stopped by hand.

In order to make it practicable to operate the machine by hand, I provide another trip 20, which is, preferably, constructed identically like trip 8, but is pivotally connected in just the reverse position to the side of the bin, in front of and in the same horizontal plane as said trip 8, and its axis is the same distance in front of the transverse vertical plane of trunnions 3 as the pivotal axis of trip 8 is to the rear of the same. The longer horizontal branch 21 of trip 20 extends beyond the front of the bin, and when it is desired to operate the machine by hand, its forward extension is allowed to rest upon a stud 23 projecting laterally from the side of the bin. When trip 20 is in this position, and arm 6 moves toward the limit of its forward movement the upper end of said arm engages the lower branch 22 of and raises trip 20 and is caught by the end of said lower branch and prevented from automatically returning. This keeps the bottom of the bin open, and it is not usable when arm 6 is so held. In order to make it again usable, it is necessary for the operator to lift arm 22 up, thus releasing arm 6 and allowing the bottom of the bin to close, in which position it is ready for the weighing operation again. When it is desired to have the machine weigh automatically and continuously, trip 20 is raised by hand until its lower branch is high enough to avoid being engaged by the upper end of arm 6 and the forward extension of the upper branch of the trip is caught and held by a segmental shaped hook 33, pivotally secured to the front of the bin next the side thereof to which the trips are pivoted. When trip 20 is disengaged by hook 33, the latter serves as a stop to prevent the operator from raising said trip too high when the machine is being operated by hand.

In Figs. 3 and 4 of the drawings, I show a modified construction of my invention in which I dispense with the use of link 15. All of the other elements are retained, but the hopper 27 is situated over the rear portion of the open top of bin C, and in order to direct the discharge from said hopper so that it will fall upon the center of plate 24 closing the bottom thereof, I provide the bin with a chute or incline 25. This incline extends from the rear upper edge of the bin downward and forward at a suitable angle, and its lower edge terminates just to the rear of the transverse vertical plane intersecting the center of the bottom.

The swinging bottom 26 of hopper 27 of this modification is constructed and is adapted to open and close the discharge opening thereof in the same manner as the swinging-bottom of the preferred form of the invention disclosed in Fig. 1 of the drawings, but it has the pendulous arm 28 connected directly to it; said arm having its upper end bent laterally in view of the fact that the hopper is narrower than the bin so as to hold it out from the side of said hopper such a distance that the vertical portion can depend alongside of the upper portion of the bin and be engaged by the upwardly extending arm 29 projecting upward from trunnions 30 from which bottom-plate 24 of the bin projects.

Arm 29 engages acute angle-shaped trips 31 and 32 that are pivotally connected at their angles to the side of the bin and operate in identically the same manner as trips 8 and 20 of the preferred form of my invention do, and the operation of this modified construction of my invention is otherwise the same as that first described, if the operation of link 15 be disregarded.

What I claim as new is:

1. In a weighing machine, a suitable scale including a balance-beam, a single bin supported by and movable with said beam, said bin having a discharge opening, a counterbalanced hinged plate adapted to close the discharge opening of said bin, and a rock-shaft from which said plate projects, in combination with a stationary superposed hopper, a plate adapted to close the discharge opening thereof, and means for imparting the motion of said rock-shaft to said plate and open the hopper when the bin is closed, and vice versa, said means including engaging members that extend from the plate which closes the bin and hopper respectively.

2. In a weighing machine, a suitable scale including a balance-beam, a single bin supported by and movable with said beam, said bin having a discharge opening, a counterbalanced hinged plate adapted to close the discharge opening of said bin, and a rock-shaft from which said plate projects, in combination with a stationary superposed hopper, a swinging plate adapted to close the discharge opening thereof, and means for imparting the motion of said rock-shaft to said plate and open the hopper when the bin is closed, and vice versa, said means including engaging members that extend from the swinging plate and the plate which closes said bin.

3. In a weighing machine, a suitable scale including a balance-beam, said bin having a discharge opening, a single bin supported by and movable with said beam, a counterbalanced hinged plate adapted to close the discharge opening of said bin, a rock-shaft from which it projects, and an arm projecting upward from said shaft, in combination with a stationary superposed hopper, a plate adapted to close the discharge opening thereof, a suitable trip engaging said arm when the bin is closed, and means engaged by said arm when said bin is discharging and causing said plate to close the discharge opening in the hopper.

4. In a weighing machine, a suitable scale including a balance-beam, a single bin supported by and movable with said beam and provided with a discharge opening in said bin, a counterbalanced hinged plate adapted to close the discharge opening of said bin, a rock-shaft from which said plate projects, and an arm projecting upward from said shaft, in combination with a stationary superposed hopper, a closure for the discharge opening of said hopper consisting of a swinging plate, a plurality of trips adapted to engage the upper end of said arm at the end of its movement in either direction, and means engaged by said arm that causes said closure to open the hopper when the bin is closed, and vice versa.

5. In a weighing machine, a suitable scale including a balance-beam, a single bin supported by and movable with said beam, said bin having a discharge opening, a counterbalanced hinged plate adapted to close the discharge opening of the same, a rock-shaft from which said plate projects, and an arm projecting upward from said plate at an obtuse angle, in combination with a superposed hopper, a swinging plate adapted to close the discharge opening thereof, an arm suitably connected to said swinging plate and depending downward and engaging the arm projecting up from the rock-shaft, and a suitable trip engaging said last-mentioned arm when the bin is closed.

6. In a weighing machine, a suitable scale including a balance-beam, a single bin supported by and movable with said beam, said bin having a discharge opening, a counterbalanced hinged plate adapted to close the discharge opening of the same, a rock-shaft from which said plate projects, and an arm projecting upward from said plate at an obtuse angle, in combination with a superposed hopper, a swinging-plate adapted to close the discharge opening thereof, an arm suitably connected to said swinging plate and depending downward and engaging the arm projecting up from the rock-shaft, and two trips adapted to engage said arm at the end of one movement thereof when the bin is closed and the end of its other movement when the bin is open.

7. In a weighing machine, a suitable scale including a balance-beam, a single bin supported by and movable with said beam, said bin having a discharge opening, a counterbalanced hinged plate adapted to close the discharge opening of the same, a rock-shaft from which said plate projects, and an arm projecting upward from said rock-shaft at an obtuse angle, in combination with a superposed hopper, a swinging plate adapted to close the discharge opening thereof, an arm suitably connected to said swinging plate and depending downward and engaging the arm projecting up from the rock-shaft, and two trips adapted to engage the arm projecting up from the rock-shaft at the end of its movements, and means for holding one of said trips out of engagement with said arm.

8. In a weighing machine, a suitable scale including a balance-beam, a single bin supported by and movable with said beam, said bin having a discharge opening, a counterbalanced hinged plate adapted to close the discharge opening of the same, a rock-shaft from which said plate projects, and an arm projecting upward from said plate at an obtuse angle, in combination with a superposed hopper, a plate adapted to close the discharge opening thereof, an arm pivoted at its upper end and depending downward and engaged by the arm projecting up from the rock-shaft, a link connecting said last-mentioned plate and said depending arm, and means for engaging and holding the arm projecting up from the rock-shaft when said bin is closed.

9. In a weighing machine, a suitable scale including a balance-beam, a single bin supported by and movable with said beam, said bin having a discharge opening, a counterbalanced hinged plate adapted to close the discharge opening of the same, a rock-shaft from which said plate projects, and an arm projecting upward from said plate at an obtuse angle in combination with a superposed hopper, a swinging plate adapted to close the discharge opening thereof, an arm suitably connected to said swinging plate and depending downward and engaging the arm projecting up from the rock-shaft, and trips adapted to engage the arm projecting up from the rock-shaft at the end of its throw in either direction.

10. In a weighing machine, a suitable scale including a balance-beam, a single bin supported by and movable with said beam, said bin having a discharge opening, a counterbalanced hinged plate adapted to close the discharge opening of the same, a rock-shaft from which said plate projects, and an arm projecting upward from said plate at an obtuse angle, in combination with a superposed hopper, a swinging plate adapted to close the discharge opening thereof, an arm suitably connected to said swinging plate and depending downward and engaging the arm projecting up from the rock-shaft, and two trips adapted to engage the arm projecting up from the rock-shaft at the end of its movements, and means for holding one of said trips out of engagement with said last-mentioned arm.

11. In a weighing machine, a suitable scale including a balance-beam, a single bin supported by and movable with said beam, said bin having a discharge opening, a counterbalanced hinged plate adapted to close the discharge opening of said bin, a rock-shaft from which it projects, an arm projecting upward from said shaft, and a pin projecting laterally from said arm, in combination with a stationary superposed hopper, and a swinging plate adapted to close the discharge opening thereof, an arm connected to said swinging plate and depending downward and having a longitudinally elongated slot in its lower end which is engaged by said pin, and means for engaging and holding the arm projecting upward from said rock-shaft when the bin is closed.

12. In a weighing machine, a suitable scale including a balance-beam, a single bin supported by and movable with said beam, said bin having a discharge opening, a counterbalanced hinged plate adapted to close the discharge opening of said bin, a rock-shaft from which it projects, an arm projecting upward from said shaft, and a pin projecting laterally from said arm, in combination with a stationary superposed hopper, a swinging plate adapted to close the discharge opening thereof, a downwardly depending arm pivoted at its upper end and having a longitudinally elongated slot in its lower portion which is engaged by a pin projecting laterally from the arm projecting upward from the rock-shaft, a link connecting said swinging plate and said depending arm, and means for engaging and holding the arm projecting upward from said rock-shaft when the bin is closed.

13. In a weighing machine, a suitable scale including a balance-beam, a single bin supported by and movable with said beam, said bin having a discharge opening, a counterbalanced hinged plate adapted to close the discharge opening of said bin, a rock-shaft from which it projects, an arm projecting upward from said shaft, and a pin projecting laterally from said arm, in combination with a stationary superposed hopper, a swinging plate adapted to close the discharge opening thereof, a downwardly depending arm pivoted at its upper end and having a longitudinally elongated slot in its lower portion which is engaged by said pin, a link connecting said swinging plate and said depending arm, and trips adapted to engage and hold the arm projecting upward from the rock-shaft at the end of its movements.

14. In a weighing machine, a suitable scale including a balance-beam, a single bin supported by and movable with said beam, said bin having a discharge opening, a counterbalanced hinged plate adapted to close the discharge opening of said bin, a rock-shaft from which it projects, an arm projecting upward from said shaft, and a pin projecting laterally from said arm, in combination with a stationary superposed hopper, a swinging plate adapted to close the discharge opening thereof, a downwardly depending arm pivoted at its upper end and having a longitudinally elongated slot in its lower portion which is engaged by said pin, a link connecting said swinging plate and said depending arm, trips adapted to engage and hold the arm projecting upward from the rock-shaft at the end of its movements, and means for holding one of said trips out of engagement with said arms.

In witness whereof I have hereunto set my hand this 13th day of November, 1915.

PETRONELLA EDTBAUER.

Witnesses:
FLORENCE MITCHELL,
FRANK D. THOMASON.